US007573593B2

(12) United States Patent
Hart et al.

(10) Patent No.: US 7,573,593 B2
(45) Date of Patent: Aug. 11, 2009

(54) PRINTER WITH HARDWARE AND SOFTWARE INTERFACES FOR MEDIA DEVICES

(75) Inventors: Peter E. Hart, Menlo Park, CA (US);
Jonathan J. Hull, San Carlos, CA (US);
Jamey Graham, San Jose, CA (US);
Kurt W. Piersol, Santa Cruz, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/814,932

(22) Filed: Mar. 30, 2004

(65) Prior Publication Data

US 2005/0068572 A1   Mar. 31, 2005

Related U.S. Application Data

(60) Provisional application No. 60/506,206, filed on Sep. 25, 2003, provisional application No. 60/506,263, filed on Sep. 25, 2003, provisional application No. 60/506,302, filed on Sep. 25, 2003, provisional application No. 60/506,303, filed on Sep. 25, 2003, provisional application No. 60/506,411, filed on Sep. 25, 2003.

(51) Int. Cl.
*G06F 3/12* (2006.01)
*G06K 15/00* (2006.01)
*H04N 7/14* (2006.01)
*H04N 5/225* (2006.01)

(52) U.S. Cl. .................. 358/1.15; 358/1.16; 348/14.03; 348/207.11; 348/207.2

(58) Field of Classification Search ................ 358/1.15, 358/1.16, 1.9, 518, 1.13; 382/117, 118, 162, 382/170; 345/505, 619; 709/205, 220; 715/738; 348/207.11, 207.2, 14.03; *H04N 15/00, 7/14, H04N 5/225; G06F 3/12; G06K 15/00*
See application file for complete search history.

(56) References Cited

U.S. PATENT DOCUMENTS 4,133,007 A    1/1979   Wessler et al.

(Continued)

FOREIGN PATENT DOCUMENTS

CA       2386829       11/2002

(Continued)

OTHER PUBLICATIONS

Gropp, W. et al., "Using MPI—Portable Programming with the Message Passing Interface", copyright 1999, pp. 35-42, second edition, MIT Press.*

(Continued)

*Primary Examiner*—James A Thompson
(74) *Attorney, Agent, or Firm*—Fenwick & West LLP

(57) ABSTRACT

A printing system enables the printing of multimedia received from a media source that is communicatively coupled to the printer. Based on the received multimedia data, the printing system produces a paper or other printed output as well as a related electronic output. Together, the printed and electronic outputs provide a representation of the multimedia. The printer is also capable of communicating and controlling the functionality of the media source. Depending on the desired application for the printer, the printer may include any combination of mechanisms for receiving media data, printing the printed output, and producing the electronic output.

57 Claims, 8 Drawing Sheets

U.S. PATENT DOCUMENTS

| | | | |
|---|---|---|---|
| 4,205,780 A | 6/1980 | Burns et al. | |
| 4,437,378 A | 3/1984 | Ishida et al. | |
| 4,619,522 A | 10/1986 | Imai | |
| 4,635,132 A | 1/1987 | Nakamura | |
| 4,734,898 A | 3/1988 | Morinaga | |
| 4,754,485 A * | 6/1988 | Klatt | 704/260 |
| 4,807,186 A * | 2/1989 | Ohnishi et al. | 714/48 |
| 4,831,610 A | 5/1989 | Hoda et al. | |
| 4,881,135 A * | 11/1989 | Heilweil | 386/107 |
| 4,907,973 A | 3/1990 | Hon | |
| 4,998,215 A | 3/1991 | Black et al. | |
| 5,059,126 A | 10/1991 | Kimball | |
| 5,091,948 A | 2/1992 | Kametani | |
| 5,093,730 A | 3/1992 | Ishii et al. | |
| 5,115,967 A | 5/1992 | Wedekind | |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A | 1/1995 | Jacobs | |
| 5,428,555 A | 6/1995 | Starkey et al. | |
| 5,432,532 A * | 7/1995 | Mochimaru et al. | 347/176 |
| 5,436,792 A * | 7/1995 | Leman et al. | 361/686 |
| 5,438,426 A | 8/1995 | Miake et al. | |
| 5,444,476 A | 8/1995 | Conway | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,568,406 A * | 10/1996 | Gerber | 702/159 |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A * | 4/1997 | Ito et al. | 348/222.1 |
| 5,624,265 A | 4/1997 | Redford et al. | |
| 5,627,936 A | 5/1997 | Prasad et al. | |
| 5,628,684 A | 5/1997 | Bouedec | |
| 5,633,723 A * | 5/1997 | Sugiyama et al. | 358/296 |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,560 A | 10/1997 | Hara et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A | 2/1998 | Katsuo et al. | |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A | 3/1999 | Feitelson et al. | |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A | 10/1999 | Nicponski | |
| 5,987,226 A * | 11/1999 | Ishikawa et al. | 358/1.13 |
| 5,999,173 A | 12/1999 | Ubillos | |
| 6,000,030 A | 12/1999 | Steinberg et al. | |
| 6,006,241 A | 12/1999 | Purnaveja et al. | |
| 6,020,916 A * | 2/2000 | Gerszberg et al. | 348/14.07 |
| 6,038,567 A | 3/2000 | Young | |
| 6,043,904 A | 3/2000 | Nickerson | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A * | 9/2000 | Huberman et al. | 707/102 |
| 6,118,888 A * | 9/2000 | Chino et al. | 382/118 |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 * | 2/2001 | Wendelken et al. | 600/437 |
| 6,199,042 B1 | 3/2001 | Kurzweil | |
| 6,256,638 B1 | 7/2001 | Dougherty et al. | |
| 6,296,693 B1 | 10/2001 | McCarthy | |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,302,527 B1 | 10/2001 | Walker | |
| 6,307,956 B1 | 10/2001 | Black et al. | |
| 6,308,887 B1 | 10/2001 | Korman et al. | |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | F.ang.hraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,544,294 B1 | 4/2003 | Greenfield et al. | |
| 6,552,743 B1 | 4/2003 | Rissman | |
| 6,556,241 B1 * | 4/2003 | Yoshimura et al. | 348/211.99 |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 | 7/2003 | Lai et al. | |
| 6,594,377 B1 | 7/2003 | Kim et al. | |
| 6,611,276 B1 | 8/2003 | Muratori et al. | |
| 6,611,622 B1 | 8/2003 | Krumm | |
| 6,611,628 B1 | 8/2003 | Sekiguchi et al. | |
| 6,625,334 B1 | 9/2003 | Shiota et al. | |
| 6,647,534 B1 | 11/2003 | Graham | |

| Patent No. | Date | Inventor(s) |
|---|---|---|
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 | 10/2006 | Lapstun |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,228,492 B1 | 6/2007 | Graham |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 7,363,580 B2 | 4/2008 | Tabata et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1* | 1/2002 | Stevens et al. ............ 705/26 |
| 2002/0011518 A1 | 1/2002 | Goetz et al. |
| 2002/0015066 A1 | 2/2002 | Siwinski et al. |
| 2002/0023957 A1 | 2/2002 | Michaelis et al. |
| 2002/0048224 A1* | 4/2002 | Dygert et al. ............ 369/1 |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101343 A1 | 8/2002 | Patton |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1* | 9/2002 | Myojo ............ 455/557 |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1* | 11/2002 | Schroath ............ 709/218 |
| 2002/0171857 A1 | 11/2002 | Hisatomi et al. |
| 2002/0185533 A1* | 12/2002 | Shieh et al. ............ 235/441 |
| 2002/0199149 A1 | 12/2002 | Nagasaki et al. |
| 2003/0002068 A1* | 1/2003 | Constantin et al. ......... 358/1.15 |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0160898 A1 | 8/2003 | Baek et al. |
| 2003/0164898 A1 | 9/2003 | Imai |
| 2003/0177240 A1 | 9/2003 | Gulko et al. |
| 2003/0187642 A1 | 10/2003 | Ponceleon et al. |
| 2003/0218597 A1 | 11/2003 | Hodzic |
| 2003/0220988 A1* | 11/2003 | Hymel ............ 709/220 |
| 2003/0231198 A1 | 12/2003 | Janevski |
| 2004/0024643 A1 | 2/2004 | Pollock et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engleson et al. |
| 2004/0156616 A1 | 8/2004 | Strub et al. |
| 2004/0167895 A1 | 8/2004 | Carro |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2005/0038794 A1 | 2/2005 | Piersol |
| 2005/0068569 A1 | 3/2005 | Hull et al. |
| 2005/0068581 A1 | 3/2005 | Hull et al. |
| 2005/0083413 A1 | 4/2005 | Reed et al. |
| 2005/0125717 A1 | 6/2005 | Segal et al. |
| 2005/0149849 A1 | 7/2005 | Graham et al. |
| 2005/0213153 A1 | 9/2005 | Hull et al. |
| 2005/0216838 A1 | 9/2005 | Graham |
| 2005/0216852 A1 | 9/2005 | Hull et al. |
| 2006/0043193 A1 | 3/2006 | Brock |
| 2006/0136343 A1 | 6/2006 | Coley et al. |
| 2006/0171559 A1 | 8/2006 | Rhoads |

| | | | |
|---|---|---|---|
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0268164 | A1 | 11/2007 | Lai et al. |
| 2008/0037043 | A1 | 2/2008 | Hull et al. |

FOREIGN PATENT DOCUMENTS

| | | |
|---|---|---|
| CN | 1352765 A | 6/2002 |
| CN | 1097394 C | 12/2002 |
| EP | 1133170 A2 | 9/2001 |
| WO | WO 99/18523 | 4/1999 |
| WO | WO 02/082316 A1 | 10/2002 |

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Configuring A Printer (NT), Oxford Computer Support [online] [Retrieved on Nov. 13, 2003] Retrieved from the Internet<URL: http://www.nox.ac.uk/cehoxford/ccs/facilities/printers/confignt.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, p. II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL: http://www.maxwell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 2005]. Retrieved from the Internet: <URL: http://www.tastyfotoart.com>.

Poon, K.M. et al., "Performance Analysis of Median Filtering on Meiko™ —A Distributed Multiprocessor System," IEEE First International Conference on Algorithms and Architectures for Parallel Processing, 1995, pp. 631-639.

Dimitrova, N. et al., "Applications of Video-Content Analysis and Retrieval," IEEE Multimedia. Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Jul.-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Chinese Application No. 2004100849823 Office Action, Jun. 1, 2007, 24 pages.

Chinese Application No. 2004100897988 Office Action, Apr. 6, 2007, 8 pages.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003. pp. 89-96.

Karasik, D., "Image Processing in Perl Graphic Applications," Google, Apr. 2, 2003, pp. 1-12.

U.S. Appl. No. 10/660,867, filed Sep. 12, 2003, Erol et al.

Brown et al., "A Diary Study Of Information Capture In Working Life," Proceedings Of ACM CHI 2000 Conference On Human Factors In Computing Systems, 2000, pp. 438-445, vol. 1.

Erol, Berna et al., "Linking Multimedia Presentations With Their Symbolic Source Documents: Algorithm And Applications," ACM Multimedia '03, Nov. 2-8, 2003, pp. 498-507, Berkeley, CA.

Erol, Berna et al., "Prescient Paper: Multimedia Document Creation With Document Image Matching," 17$^{th}$ International Conference On Pattern Recognition, Aug. 2004, 4 pages, Cambridge, U.K.

Erol, Berna et al, "Retrieval Of Presentation Recordings With Digital Camera Images," IEE Conference On Computer Vision And Pattern Recognition (CVPR), Jun. 27-Jul. 2, 2004, 2 pages, Washington, D.C.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Karasik, "Image Processing in Perl Graphic Applications," Google Apr. 2, 2003, pp. 1-12.

Lienhart, Rainer et al., "Localizing And Segmenting Text In Images And Videos," IEEE Transactions On Circuits And Systems For Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name And Address Block Reader System For Tax Form Processing," IEEE, 1995, pp. 5-10.

Lauesen, "User Interface Design: A Software Engineering Perspective," 2005, Preface, Part A, Chapter 1, 28 pages.

* cited by examiner

PRINTER WITH HARDWARE AND SOFTWARE INTERFACES FOR MEDIA DEVICES

CROSS REFERENCE TO RELATED APPLICATIONS

This application claims the benefit of the following provisional patent applications, each of which is incorporated by reference in its entirety: U.S. Provisional Application No. 60/506,206, filed Sep. 25, 2003; U.S. Provisional Application No. 60/506,263, filed Sep. 25, 2003; U.S. Provisional Application No. 60/506,302, filed Sep. 25, 2003; U.S. Provisional Application No. 60/506,303, filed Sep. 25, 2003; and U.S. Provisional Application No. 60/506,411, filed Sep. 25, 2003.

This application is also related to the following applications, each of which was filed on Mar. 30, 2004 and each of which is incorporated by reference herein in its entirety: application Ser. No. 10/814,751, entitled "Networked Printer With Hardware and Software Interfaces for Peripheral Devices," and application Ser. No. 10/813,847, entitled "Stand Alone Printer With Hardware/Software Interfaces for Sharing Multimedia Processing,".

BACKGROUND

1. Field of the Invention

The present invention relates generally to document printers and, more specifically, to document printers that can receive, process, and transform multimedia data from a peripheral device.

2. Background of the Invention

Cost and quality improvements in multimedia technologies have led to a proliferation of digital devices with multimedia capabilities. High-quality video cameras and cellular phones with multimedia capabilities are becoming commonplace in the home and workplace, and have proven to be useful for diverse purposes ranging from teleconferencing to managing information. Multimedia data captured by such devices are typically delivered in an unprocessed form to a medium such as a digital tape or memory card.

A conventional printer can receive multimedia data in a number of formats and then print the contents of those data in accordance with the proper format. But while conventional printers can print documents in a wide variety of formats, these printers are fundamentally limited in their ability to take in contents from multimedia devices such as video cameras and cellular phones and process the data to create a useable record. For example, it is standard technology for a printer to produce images of static text, pictures, or a combination of the two. However, creating multimedia output from a peripheral device typically involves several disparate steps, each potentially requiring considerable effort. Oftentimes, a user will have to convert and transfer multimedia data in different stages to different devices—for instance transferring a video clip from a video camera, then into a summary file containing excerpts of the video file, then to a memory or output device. While the processing of a multimedia file from a peripheral device commonly involves the same repeated tasks, there is no easy way to automate them. In addition, because the multimedia data from a peripheral device are typically not printed to a paper document, they are difficult to incorporate into the existing paper-based workflow by which most offices function. Although means do exist to map multimedia data from a peripheral device to paper friendly and electronic outputs, these additional conversion steps are often not automated or performed.

Thus, there is a need for an integrated printer that can receive multimedia data from a peripheral device, process it, and deliver an output to a printed document or other media. It is further desirable that such a printer be able to perform at least some of the necessary processing itself, while some of the processing may be performed on an external device, rather than require an attached computer or other device to perform all of the processing.

SUMMARY OF THE INVENTION

The present invention overcomes the deficiencies and limitations of the prior art by providing systems and methods in which multimedia data from a peripheral device are received by a printer, the data are processed, and the printer outputs the result. In a typical hardware configuration for such a multifunction printer, a printer includes a peripheral interface that communicates with a peripheral device, a print engine that produces a paper or other printed output, and one or more electronic devices that produce a related electronic output. Together, the printed and electronic outputs provide an improved representation of the multimedia data from the peripheral device over that of a conventional paper printer.

In one embodiment, a printing system includes a network coupled to a network device and a printing system. An interface receives multimedia data from a peripheral device, and a multimedia processing system is coupled to the interface for processing the multimedia data. Based on any of a number of desired applications, the multimedia processing system determines a printed representation of the multimedia data and an electronic representation of the multimedia data. To enable sharing of the computing load, the multimedia processing system may reside at least in part on the printing system and at least in part on the peripheral device. A printed output system in communication with the multimedia processing system receives the printed representation and produces a corresponding printed output. Similarly, an electronic output system in communication with the multimedia processing system receives the electronic representation and produces a corresponding electronic output. In this way, the printer creates a representation of multimedia data from a peripheral device by producing a printed output and an electronic output.

In various embodiments, the system includes hardware and software for processing multimedia contents and various mechanisms for creating the electronic and printed outputs. For example, the interface may include a single communication interface, a network interface, a wireless interface, personal digital assistant (PDA) device, a cellular phone, a removable media storage device reader, a video input device (such as a DVD reader), an audio input device (such as a CD reader or an MP3 player), a digital video recorder (e.g., TiVO), screen capture hardware, a video and/or audio recorder, or any of a number of different types of devices that can receive multimedia data. Similarly, the electronic output system may write the electronic representation to one or more different types of removable media storage devices, such as a DVD, a digital video recorder, a digital audio recorder, a CD, a flash card, a computer disk, an SD disk, or another computer-readable medium. The electronic output system may also include a disposable media writer, a self-destructing media writer, a video display, an audio speaker, a driver for a speaker system (such as an embedded MIDI player), or an embedded web page display. In this way, a multifunction printer can be configured to process any of a large number of multimedia data from various peripheral devices, allowing various embodiments of the printer to meet the needs of many different applications.

Because of the great many combinations of input and output devices possible for the printing system, the system may include hardware, software, or a combination thereof for performing a wide variety of different operations on the multimedia data. In this way, the system can be configured to produce various types of printed and electronic outputs based on received multimedia data to meet the needs of different applications. To solve various problems, in embodiments of the system, the multimedia processing system includes one or more of an embedded multimedia module Moreover, the processing logic in the printing system can be configured to communicate with a peripheral device via the peripheral interface. Thus, the processing logic has the capability to operate the peripheral device and transfer data to the peripheral device.

These different tasks may be performed on the printer by the multimedia processing system, or partially on the printer by the multimedia processing system in conjunction with one or more electronic devices capable of performing some of the required processing steps. The printer can thus balance the required processing of the multimedia data between the printer and one or more connected electronic devices, such as a personal computer or an external network service. By conducting at least some of the processing on the printer, the printer relieves at least some of the processing load on external devices that the printer's additional functionality may require.

DETAILED DESCRIPTION OF THE PREFERRED EMBODIMENTS

Various embodiments of a printing system with a peripheral interface enable the printing of multimedia in a useful and intelligent format. To create a representation of this multimedia data, the printing system produces a printed output and a related electronic output, which together provide a representation of the received multimedia data. Depending on the desired application, the printing system includes a multimedia module with any number of functionalities for processing the multimedia data, printing the printed output, and producing the electronic output. Therefore, a number of embodiments of the printing system are described herein to show how such a system can be configured in a wide variety of combinations to solve or address a great number of needs that exist.

System Architecture

Figure 1:
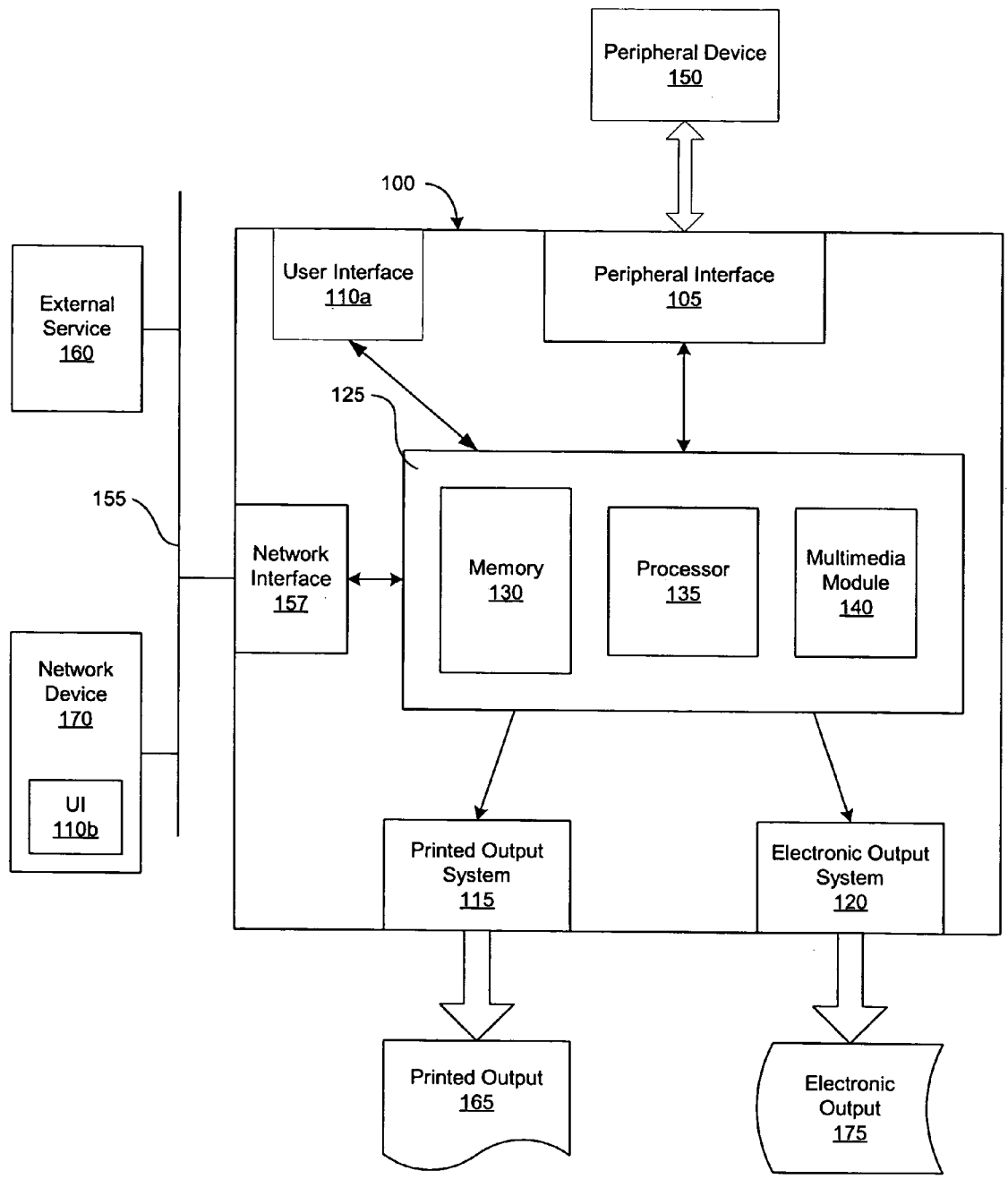
FIG. 1 is a schematic diagram of a system in accordance with an embodiment of the invention.

FIG. 1 is a diagram of one embodiment of a networked printing system, which includes a printer 100 in communication with a peripheral device 150 and a network device 170. A network 155 enables communication between the printing system 100 and the network device 170. Printing system 100 includes a peripheral interface 105, user interface 110a, a printed output system 115, an electronic output system 120, and a multimedia processing system 125. Capable of receiving multimedia data from a peripheral device 150 and a network device 170, the peripheral interface 105 and network interface 157, respectively, can each take a variety of forms and may include one or more devices that can receive multimedia data or create multimedia data by observing a media event. Similarly, the printed output system 115 and the electronic output system 120 can take a variety of forms and may each include one or more devices that can produce, respectively, a printed output 165 and an electronic output 175.

In one embodiment, the multimedia processing system 125 includes a memory 130, a processor 135, and a multimedia processing module 140. The multimedia processing module 140, which is described in more detail below, may include software, hardware, or a combination thereof for implementing at least a portion of the functionality of the printing system 100. The multimedia processing system 125 is coupled to the peripheral interface 105 and network interface 157, allowing it to communicate with each. The media processing system 125 is also coupled to the printed output system 115 and to the electronic output system 120 for providing the appropriate commands and data to those systems.

The printing system 100 further includes a network interface 157, functionally coupled to the multimedia processing system 125. The network interface 157 allows the printing system 100 to communicate with other electronic devices, such as network device 170 and external service 160. In one embodiment, the network device 170 is a computer system, such as a personal computer. Network device 170 includes processing capability for performing processing on the multimedia data. In this way, the network device 170 can relieve the printing system 100 of some of the processing load required to produce printed and electronic outputs from the multimedia data. In one embodiment, the network device 170 includes a user interface 110b that allows a user to make selections about the processing of the multimedia and/or about the format or destination of the printed or electronic outputs. In other embodiments, the user interface 110b can be located on another attached device, or the user interface 110a can be located on printer 100 itself. The user interfaces 110a, 110b may include a display system, software for communicating with an attached display, or any number of embodiments described in co-pending U.S. patent application entitled, "User Interface for Networked Printer," filed Mar. 30, 2004, Ser. No. 10/814,500, which application is incorporated by reference in its entirety.

In another embodiment, the printing system 100 is coupled to an external service 160, which includes hardware and/or software for performing some of the processing tasks on the multimedia to be printed. In a typical embodiment, a remote service provider operates the external service 160. In such an embodiment, whereas the network device 170 may communicate with the printing system 100 over a local area network, the external service may communicate with the printing system 100 over a wide area network or over the Internet. By sharing the media processing tasks with an external service 160, possibly operated by a service provider, the printing system can perform tasks that are under the control of the service provider. In this way, a service can be set up around a particular form of multimedia processing, where a user pays for use of the service.

Figure 2:
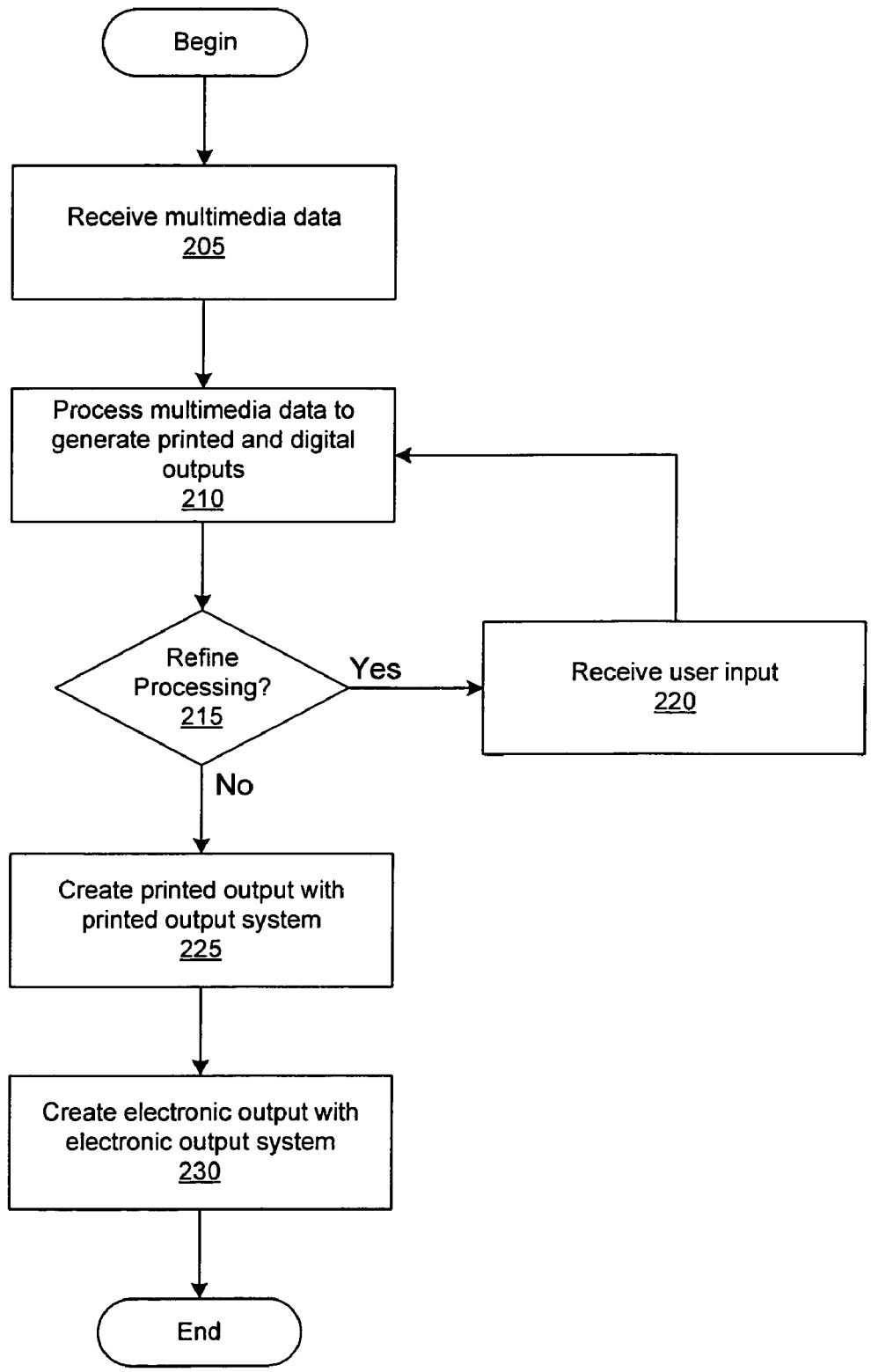
FIG. 2 is a flow diagram of the operation of a system in accordance with an embodiment of the invention.

FIG. 2 shows an overview of a generalized process in which the printing system 100 creates a representation of multimedia data, in accordance with one embodiment of the invention. The system 100 first receives 205 multimedia data from a peripheral device 150 via the peripheral interface 105, or alternatively from a network device 170 via the network interface 157. This multimedia data may be received as digital or analog data, or it may be an observable event that the interface records as digital or analog data. Coupled to the interfaces 105, 157 to receive the multimedia data, the multimedia processing system 125 processes 210 the data to generate printed and electronic outputs. This processing 210 is performed in accordance with the intended functionality of the printing system 100, and examples of different operations are described in greater detail below.

In one embodiment, the system automatically generates a printed output or an electronic output of the multimedia data based on a predefined format and the functionality of the peripheral device 150 that is connected to the peripheral interface 105 or network interface 157. For example, the multimedia processing system can take a video clip from a digital video camera connected to peripheral interface 105 and automatically generate a printed output 165 containing key frames and bar codes for accessing video segments of the video file.

In another embodiment, the system 100 includes a user interface 110a to allow a user to preview the generated outputs. If the user desires to refine 215 the processing, the user can enter commands, which the printing system 100 receives 220 by way of the user interface 110a. Based on the user's commands, the printing system 100 then repeats the processing 210 of the media data to generate new printed and electronic outputs. This refinement process can be iterated until the user is satisfied with the printed and electronic outputs. When this occurs, the user indicates that the printing should commence, for example, by invoking a print command with the user interface 110a. The multimedia processing system 125 then sends the generated printed output to the printed output system 115 and the electronic output to the electronic output system 120. The printed output system 115 then creates 225 a printed output 165, and the electronic output system 120 creates 230 an electronic output 175.

It can be appreciated that this generalized description of a multifunction printer lends itself to a great number of specific configurations and applications. Accordingly, examples of the possible configurations, applications, and particular components are further described.

Peripheral Interface

Figure 3:
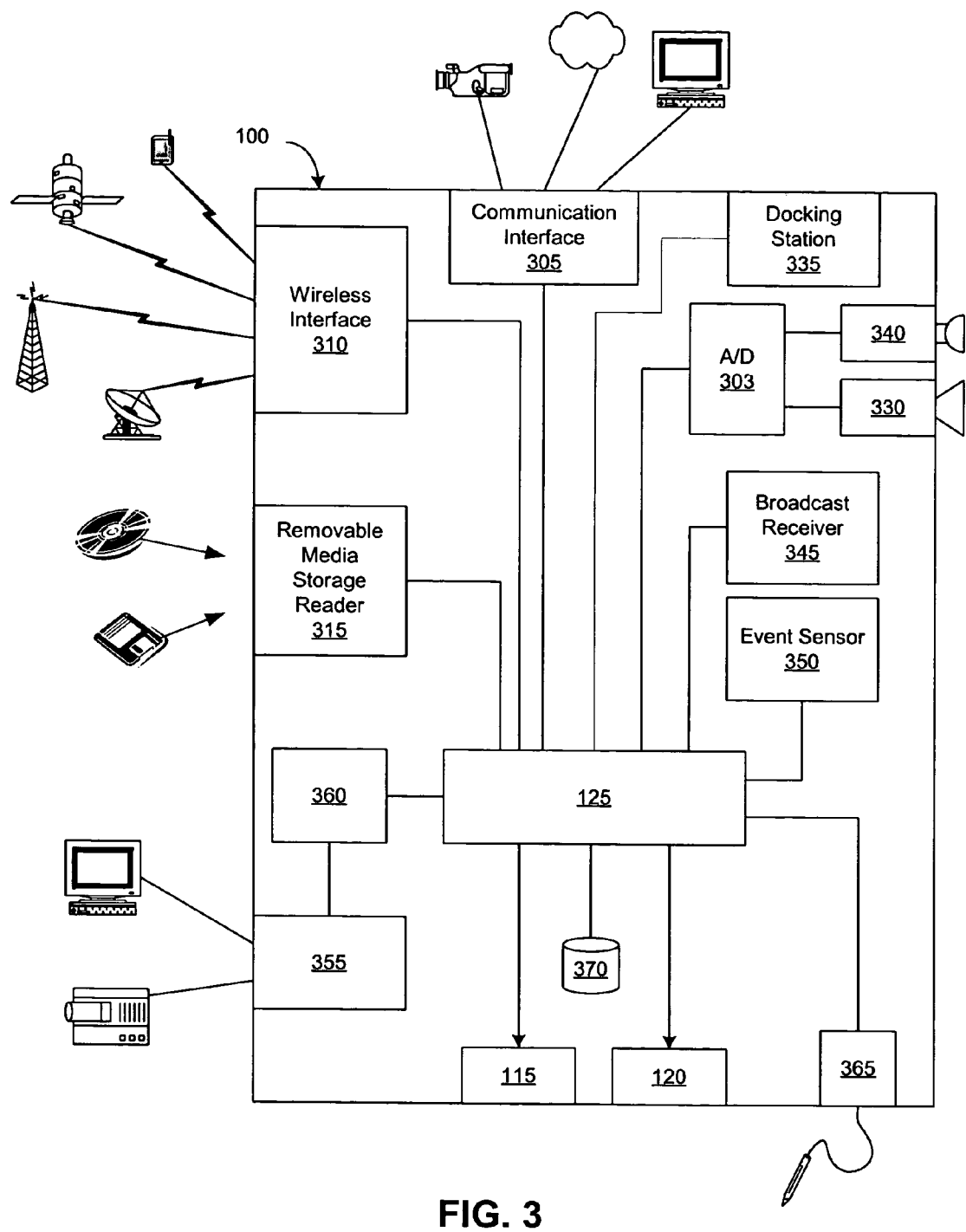
FIG. 3 is a schematic diagram of various peripheral interfaces of the printer, in accordance with embodiments of the invention.

The peripheral interface 105 can be designed to accommodate any suitable type of multimedia peripheral device 150. Because of the great variety of types and formats of multimedia data, the peripheral interface 105 may take any number of forms to accept any devices 150 that a user might wish to connect to print the multimedia data. FIG. 3 illustrates some examples of different interfaces 105 by which the printer 100 can receive multimedia data from a peripheral device or network device. In particular implementations, system 100 may have only one or only a subset of these types of interfaces 105, and in addition may have other types of interfaces not shown.

As shown in FIG. 3, the printer 100 may include a communication interface 305 that allows the printer 100 to be communicatively coupled to another electronic device. Depending on the desired input, the interface 305 may allow the printer 100 to communicate with a wide variety of different peripheral devices 150 that can provide the printer 100 multimedia data to print. Without intending to limit the types of devices, the interface 305 may allow the printer 100 to received media data from peripheral devices 150 such as computer systems, computer networks, digital cameras, cellular telephones, PDA devices, video cameras, media renderers (such as DVD and CD players), media receivers (such as televisions, satellite receivers, set-top boxes, radios, and the like), digital video recorders (such as a TiVO), a portable meeting recorder, external storage devices, video game systems, or any combination thereof. The connection type for the interface 305 can take a variety of forms based on the type of device that is intended to be connected to the printer 100 and the available standard connections for that type of device. For example, the interface 305 may comprise a port for connecting the device using a connection type such as USB, serial, FireWire, SCSI, IDE, RJ11, parallel port (e.g., bi-directional, Enhanced Parallel Port (EPP), Extended Capability Port (ECP), IEEE 1284 Standard parallel port), optical, composite video, component video, or S-video, or any other suitable connection type.

In another embodiment, the printing system 100 includes a wireless interface 310. As illustrated, the wireless interface 310 allows system 100 to receive multimedia data from a wireless device external to system 100. The wireless interface 310 may allow the system 100 to communicate with any number of wireless communication systems, such as wireless components on a home or business network, cellular phones and other portable wireless devices, satellites, satellite dishes, and devices using radio transmissions. Depending on the types of external devices with which system 100 is communicating, the wireless interface 310 may comprise hardware and/or software that implements a wireless communications protocol, such as that described in IEEE 802.11 or the Bluetooth standard.

In another embodiment, system 100 receives media data from a removable media storage reader 315 that is built into the printer 100. The removable media storage reader 315 may be configured to accommodate any type of removable media storage device, such as DVDs, CDs, video cassette tapes, audio cassette tapes, floppy disks, ZIP disks, flash cards, micro-drives, memory sticks, SD disks, or any other suitable type of multimedia storage device. Moreover, the printing system 100 may have a plurality of removable multimedia storage readers 315 to accommodate multiple types of media storage devices.

In another embodiment, the printer 100 includes an embedded video recorder 330. In this embodiment, the external source of media data is a series of images captured by the embedded the video recorder 330. The video recorder 330, such as a camera, CCD, or other suitable mechanism for capturing a sequence of images, converts a scene into a suitable electrical format, such as that described in the MPEG, H.263, or H.264 standards. Optionally, an analog-to-digital converter 303 converts an image directly from the video recorder 330 into a digital format, which is then provided to the media processing system 125. In yet another embodiment, the media processing system 125 receives raw video data from the video recorder 330 and performs any necessary conversion, encoding, and compression on the video data.

In another embodiment, the printer 100 includes an embedded audio recorder 340. In this embodiment, the external source of media data is a series of sounds that are converted into an electrical format by the embedded audio recorder 340. The audio recorder 340 converts the recorded sound signal into a suitable electrical format, such as that described in MPEG-2. Optionally, an analog-to-digital converter 303 converts the sound directly from the audio recorder 340 into a digital format, which is then provided to the media processing system 125. In yet another embodiment, the media processing system 125 receives raw audio data from the audio recorder 340 and performs any necessary conversion, encoding, and compression on the audio data.

In another embodiment, the printer 100 comprises a media broadcast receiver 345. The media broadcast receiver 345 can be tuned to a media broadcast from a media broadcaster. Types of media broadcasts that can be tuned into and received include broadcasts from the Internet, cable, television, radio, and any other broadcasted media source. To tune into a particular media broadcast, a user may select the broadcast using the user interfaces 110a, 110b. In one embodiment, the broadcast receiver 345 is an embedded TV receiver, an embedded radio receiver, an embedded short-wave radio receiver, an embedded satellite radio receiver, an embedded two-way radio, an embedded cellular phone, or a combination of any of the above. However, these are not meant to be limiting, as the broadcast receiver 345 can be any device that is capable of tuning into a signal and receiving media data therefrom.

In another embodiment, the printer 100 includes an embedded event sensor 350 that receives a signal about or otherwise observes a real-world event. Similar to a broadcast receiver 345, the event sensor 350 may receive data about a real-world event, for example, by an embedded National Weather Service radio alert receiver or an embedded TV Emergency Alert System (EAS) alert monitor. Alternatively, the event sensor 350 may comprise an embedded heat sensor, an embedded humidity sensor, or another type of measuring device so that the event sensor 350 can directly measure the environment and generate time-based media therefrom. In this way, the printer 100 can be used to record events near the printer or far from it and generate meaningful time-based informational outputs based on those events.

In another embodiment, system 100 includes a docking station 335 that is built into the printer 100. The docking station 335 may be configured to accommodate any type of peripheral device, such cell phones, digital audio recorders, video camcorders, portable meeting recorders, fixed position meeting recorders, head-mounted video cameras, office-based PC experience capture systems, or any other suitable type of multimedia peripheral devices. Moreover, the printer 100 may have a plurality of docking stations 335 to accommodate multiple types of peripheral devices. Furthermore, it will be understood that a peripheral device 150 may also be communicatively coupled to the communication interface 305 via an external docking station.

In another embodiment, the printer may include video capture hardware 355. In one embodiment, the video capture hardware 355 is designed to be coupled to a computing system by a video cable thereof. The video cable from a display is attached to the printer 100, where the video signal is split with one signal directed to the computing system and another signal to the video capture hardware 355. The video capture hardware 355 performs a differencing between successive frames of the video signal and saves frames with a difference that exceeds a threshold on a secondary storage in the printer 100. This offloads such processing from the computing system, thereby improving responsiveness and user experience and providing an easily browseable record of a user's activities during the day. To take advantage of the printing capabilities of the multifunction printer, the user can choose to print selected frames captured by the video capture hardware 355. The printing can be generated on demand with the user interface 110a on the printer or from the attached computing system, or automatically with scheduling software. In this way, a user can view a replay of any actions taken on the computing system. Notably, the captured content can be effectively compressed because the differences between frames are small.

In another embodiment, the video capture hardware 355 is coupled to a converter module 360, such as VGA-to-NTSC conversion hardware. Such an embodiment could be used in conjunction with a projector to capture presentations made with the projector. Audio capture could also be employed to record a speaker's oral presentation. To use the video capture hardware 355 in this way, a user could connect a laptop or other computing system and the projector to the printer 100. The printer 100 then captures video frames as fast as it compares them to the most recently captured frame and retains those frames that are different. A parallel audio track may also be saved. This capability could also be used in a desktop printer to record a presentation made on a computing system connected to the printer. The printer can then save the audio itself or it can be written to a digital medium, such as an SD disk that can be played from a cell phone or a PDA. The audio could also be written to a bar code on a printed representation.

In another embodiment, the printer 100 comprises an ultrasonic pen capture device. In this embodiment, the printer 100 includes an ultrasonic pen capture device hardware module 365 that serves as a low-cost sensor that can be coupled to a paper document. With such a device, a user can write on a paper document, and the results are saved on the printer 100. In one form, the captured results include the user's writing in combination with time data that indicates when the writing occurred. This time-based media data can then be printed or sent (e.g., by electronic mail) to someone else, for example showing a user's notes as well as time stamps that indicate when the notes were taken.

In another embodiment, the printer 100 comprises a database server 370. In this embodiment, the database 370 stores and catalogs various database files such as a music catalog, video database, movie database, a digital photo catalog, and the like. The database server 370 can also serve as an Internet server in communication with network 155. In such as an embodiment, the database can host a web search engine and allow web publishing with video and audio clip segmentation, multimedia retrieval, and map retrieval (e.g., weather map and aerial images). The database can also serve as an image search engine.

Printed Output System

The printed output system 115 may comprise any standard printing hardware, including that found in standard laser printers, inkjet printers, thermal wax transfer printers, dye sublimation printers, dot matrix printers, plotters, or any other type of printing mechanisms suitable for creating a printer image on an appropriate physical medium. In the example described herein, a laser printer mechanism is described; however, it should be understood that any suitable printing system can be used. The printing system 100 includes any necessary subsystems, as known by one skilled in the art, to print on a printable medium, such as a sheet of paper.

Figure 4:
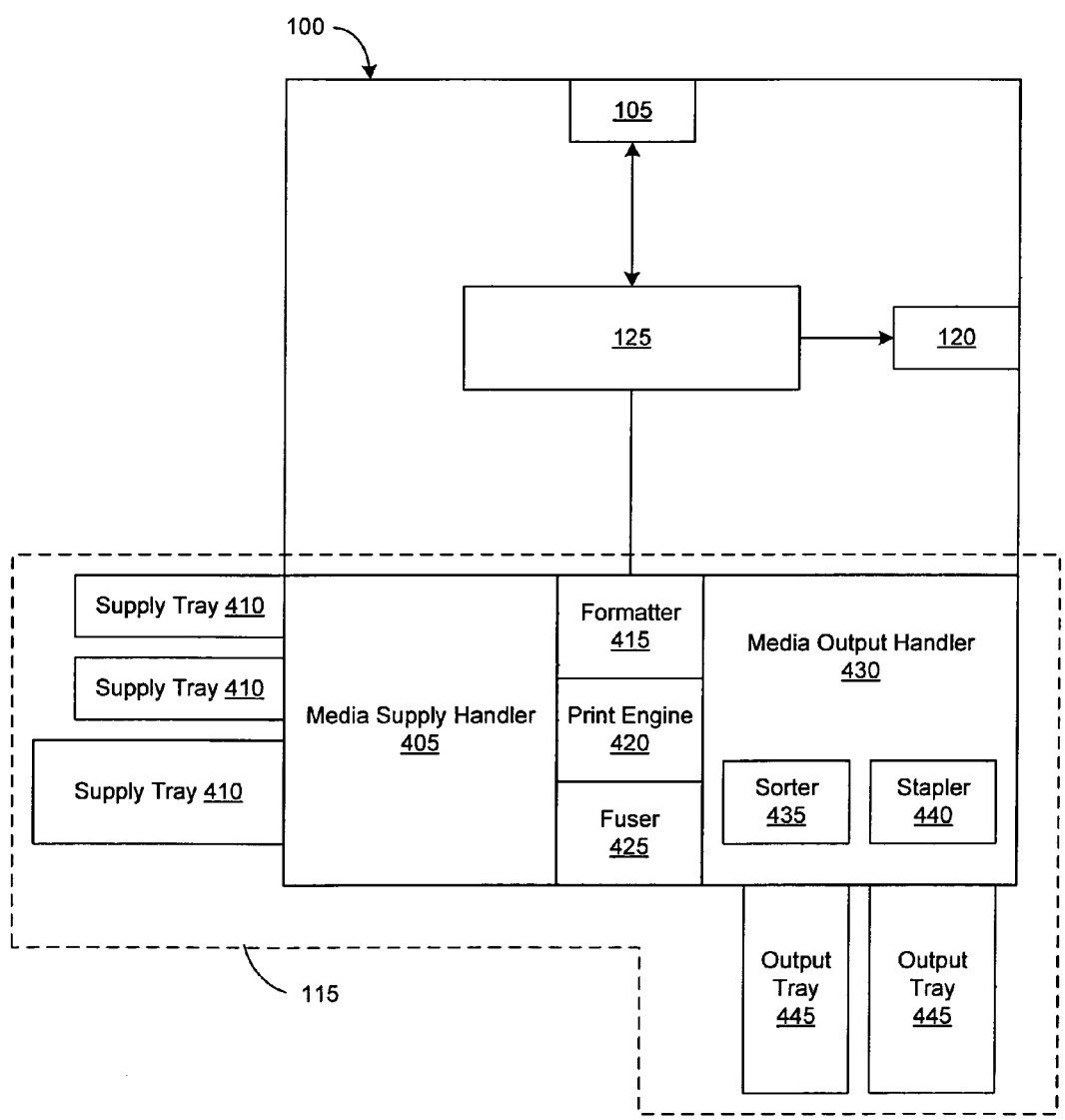
FIG. 4 is a schematic diagram of the printer's printed output system, in accordance with an embodiment of the invention.

In one embodiment, the printed output system 115 comprises a media supply handler 405 (FIG. 4) that receives blank paper to be printed on. The media supply handler 405 typically obtains the paper from a supply tray 410. The printer 100 may include multiple supply trays 410, allowing the printer to accommodate different sizes and types of paper as well as trays 410 of varying capacity. When the printer 100 needs blank paper for printing, the media supply handler 405 provides the print engine 420 with a sheet of blank medium.

The formatter 415 converts data received from the multimedia processing system 125 into a format that the print engine 420 can use to create an image on the paper. The print engine 420 creates an image on the paper as indicated by the formatter 415. A fuser 425 then uses high temperature and pressure to fuse the image onto the paper to fix the image thereon. Once the image is fixed, the paper is fed to the media output handler 430. Although not shown, it is appreciated that the printer 100 includes any necessary motors, gears, and diverters to cause the paper to move through the printer 100.

The media output handler 430 receives one or more printed sheets of paper and performs any requested finishing to the sheets. For example, the media output handler 430 may include a sorter 435 to sort or collate the sheets for multiple copies and a stapler 440 to attach the sheets together. When the finishing process is complete, the media output handler 430 moves the sheets to an output tray 445, of which there may be multiple trays 445 to accommodate different sizes, types, and capacities of printed output.

Electronic Output System

Figure 5:
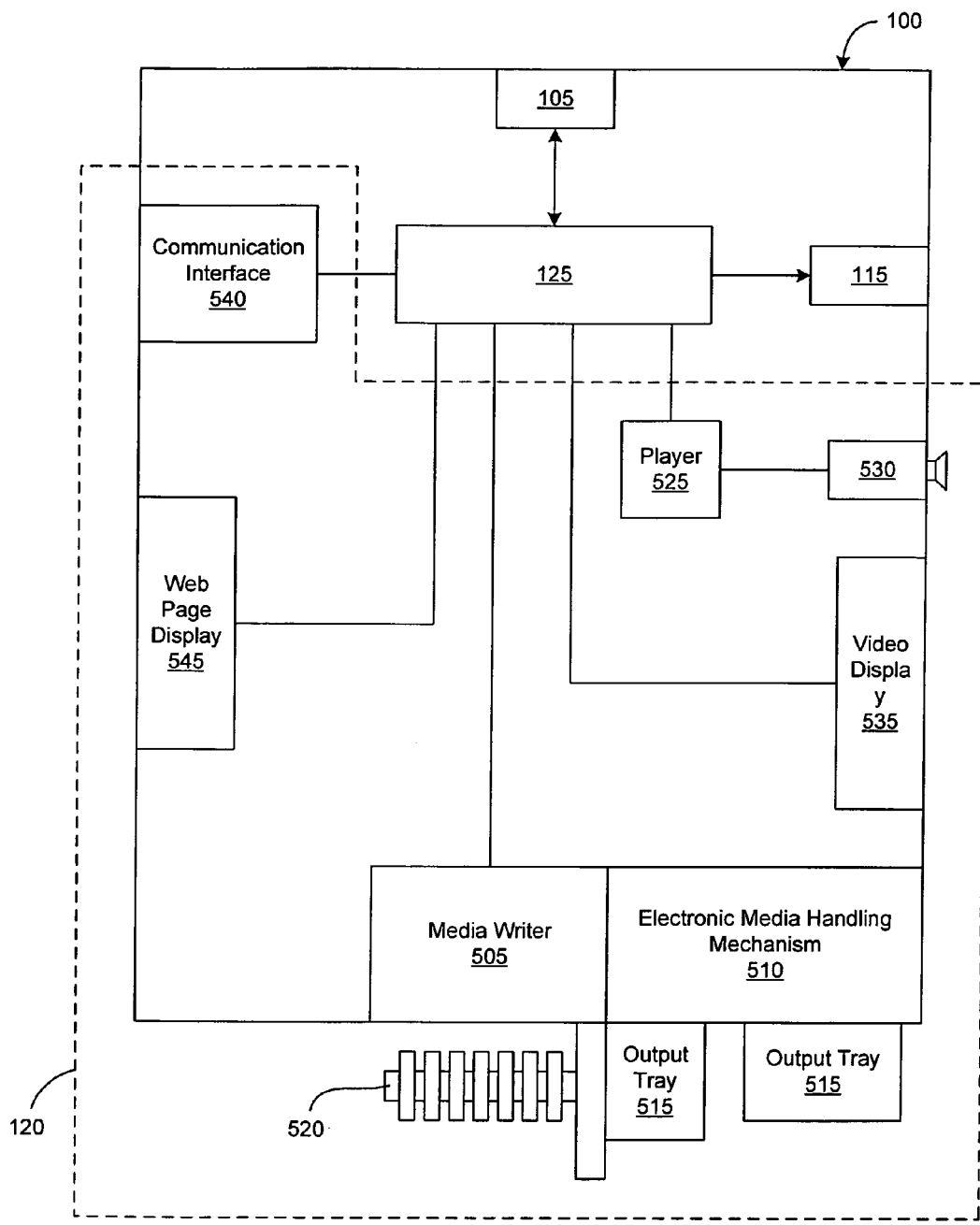
FIG. 5 is a schematic diagram of various electronic media output systems of the printer, in accordance with embodiments of the invention.

The electronic output system 120 can be designed to produce an electronic output related to the multimedia data in any desired format. Because of the great variety of types and formats of electronic outputs, the electronic output system 120 may take any of a number of forms for producing an electronic output desired by the user. FIG. 5 illustrates some examples of different embodiments of the electronic output system 120. In particular implementations, system 100 may have only one or only a subset of the various components shown, and in addition it may have other types not shown.

In one embodiment, the printer 100 writes the electronic output to a removable media device with a media writer 505. Many different types of media writers are known in the art, and the media writer 505 many comprise any of these. For example, the media writer 505 may be configured to write the electronic output to removable storage devices such as a writeable DVD or CD, a video cassette tape, an audio cassette tape, a flash card, a computer disk, an SD disk, a memory stick, or any other appropriate electronically-readable medium. Moreover, the electronic output system 120 may include a number of media writers 505 of different types to allow the printer 100 to print onto different electronic formats. In addition, the electronic output system 120 may include a number of media writers 505 of the same type to increase the output capacity of the printer 100.

The removable storage device that receives the electronic output from the printer 100 may be fed to the media writer directly by a user, for example by inserting a blank disk into a drive. In another embodiment, the printer 100 includes an electronic media handling mechanism 510 coupled to the media writer 505 that automatically provides the media writer 505 with an appropriate type of removable storage device. The handling mechanism 510 may further be configured to physically place written-to storage devices into an output tray 515. In one embodiment, a series of blank storage devices are fed to the printing system 100 by a bandolier 520 or other type of feeder, allowing the printer 100 to create a high volume of electronic output without requiring a significant amount of interaction with a human operator. The bandolier 520 preferably then places the written to devices into an output tray 515.

In another embodiment, the media writer 505 is a disposable media writer, configured to write electronic data to a disposable removable media storage mechanism. In another embodiment, the media writer 505 writes the electronic data to a self-destructing medium. In this way, a user can view the electronic data for a predetermined number of times or during a predetermined period of time, after which the electronic data are no longer viewable.

In another embodiment, the electronic output system 120 includes a speaker system 530. The speaker system 530 is designed to receive an audio signal from the media processing system 125, in response to which the audio is played from an embedded speaker 530 in the printer 100. The electronic output system 120 may further include a player 525 or audio renderer that receives an encoded audio signal from the media processing system 125 and converts it into an audio signal for the speaker 530. The player 525 thus takes some of the processing load off the media processing system 125. For example, the player 525 may include a MIDI player for generating the audio signal; however, many other audio renderers may be used, in either hardware or software.

In another embodiment, the electronic output system 120 includes a video display 535. The video display 535 is designed to receive a video signal from the media processing system 125, in response to which the video is played on the video display 535 embedded into the printer 100. Similarly, the video display 535 may receive the video signal directly from a driver to reduce the processing load on the media processing system 125.

In another embodiment, the printer 100 transmits the electronic output that is to be printed to another device as a signal. This signal can later be fixed in a tangible medium by the external device. To facilitate this, the electronic output system 120 includes a communication interface 540. The communication interface receives the electronic output from the media processing system 125 and sends the electronic output to the external device, which may be in communication with the printer 100 over a local network, the Internet, a wireless network, a direct connection, or any other suitable communication means.

In another embodiment, the electronic output system 120 comprises an embedded web page display 545. The web page display 545 allows a user to see a representation of the electronic output in a web-based form.

Multimedia Processing System

The multimedia processing system 125 of the printer 100 is designed to perform the specialized functionality of the multifunction printer 100. To send and receive messages between external devices or the user interface 110, the processing system 125 includes a processor 135 and a memory 130. In addition, the media processing system includes one or more hardware and/or software modules that enable the printer 100 to create related printed and electronic outputs for different types of multimedia data. In this way, the printer 100 can be configured to have a wide variety of multimedia processing functionalities.

Printer 100 includes an embedded multimedia module 140 that enables the printer 100 to act as a multimedia server and have associated functionality. In various embodiments, the multimedia module 140 includes hardware and software for carrying out multimedia functionality, media processing software, and computer interface hardware and software. In this way, the printer 100 can act like a multimedia server, which could be shared by a work group or used as a personal printer. Various embodiments of a multifunction printer having multimedia functionality are possible applications for a printer in accordance with embodiments of this invention. A number of specific embodiments for such a printer are described in a co-pending U.S. patent application entitled, "Printer with Multimedia Server," filed Mar. 30, 2004, Ser. No. 10/814,842, which application is incorporated by reference in its entirety.

Figure 6:
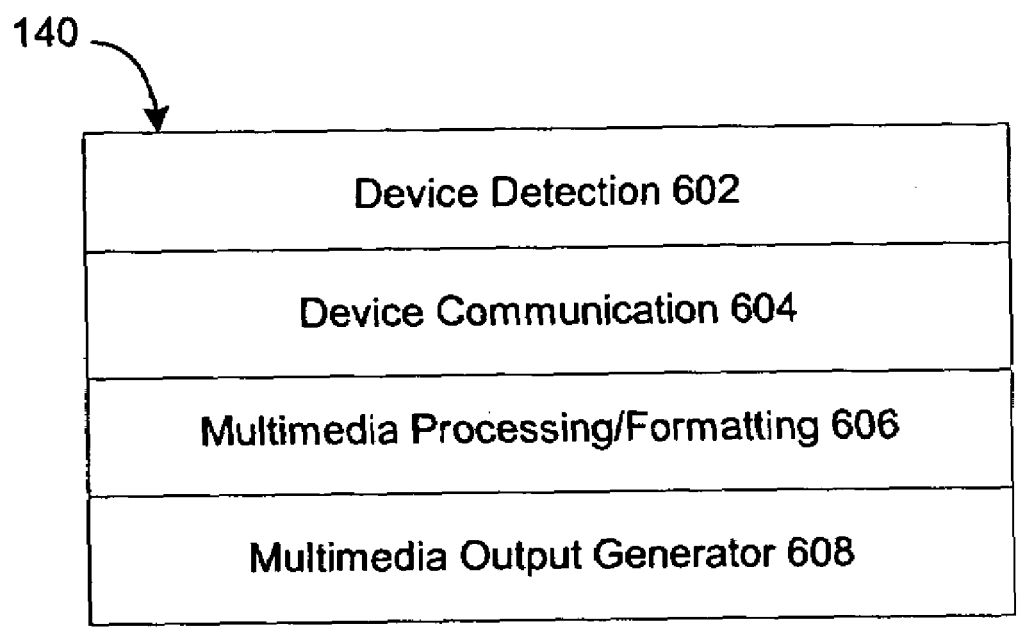
FIG. 6 is a schematic diagram of a multimedia module of the printer, in accordance an embodiment of the invention.

In one embodiment, as illustrated in FIG. 6, multimedia module 140 includes software and hardware to automatically detect 602 the coupling of a peripheral device 150, a module to communicate with a peripheral device 604, a module to process and format multimedia data 606, and a module to generate an output 608. Multimedia module 140 is also configured to detect the presence of and communicate with a network device 170 in a similar manner.

Figure 7:
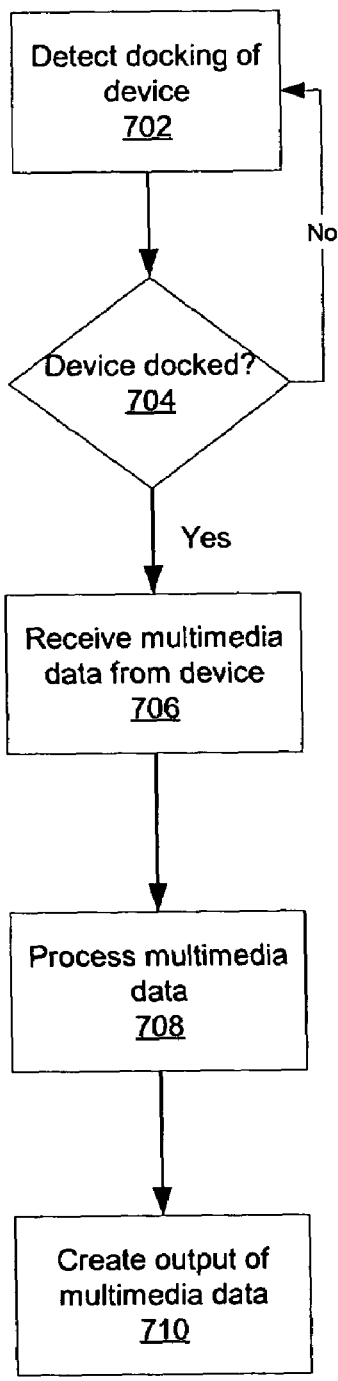
FIG. 7 is a flow diagram of the operation of a system for automatically receiving multimedia data from a docked peripheral device, in accordance to an embodiment of the invention.

In an embodiment, as illustrated in FIG. 7, the device detection module 602 automatically detects 702 the docking (or communicative coupling via a network) of a peripheral device 150 and downloads multimedia data from the peripheral device for processing by the printer 100. The multimedia processor 125 can utilize such protocols as the Plug and Play (PnP) or Universal Plug and Play (UPnP) protocol to automatically detect and communicate with devices that have PnP capabilities. With UPnP, devices can automatically communicate with each other directly, convey their capabilities, and learn about the presence and capabilities of other devices. Those skilled in the art will recognize that other detection methods, such as polling techniques (e.g., 704), may be used to automatically detect the coupling of a peripheral device. Alternative systems for connection, such as IEEE 1394 cabling or Universal Serial Bus cabling, have equivalent standards for device and capability discovery. Alternatively, one embodiment might detect the presence of an active electrical circuit in a physical connector, such as an RS232 serial port connector, between the docked device and printer 100.

Once a device is docked to the printer 100 via peripheral interface 105 or network interface 157, the device communication module 604 is configured to communicate with the peripheral device 150. Again, PnP capabilities of a device will allow the communication module 604 to communicate with the device. The communication module 604 may be configured with specific software drivers to enable communication with specific peripheral devices. In one embodiment, the communication module 604 enables the printer 100 to operate a docked peripheral device to capture multimedia data. In such an embodiment, the printer 100 can also send commands to the docked peripheral device 150 and operate the device by controlling certain functionalities of the device. For example, the printer 100 could communicate with a docked cell phone to automatically bill the owner of the phone through her cell phone provider, or based on information in an XML profile on the phone. In another example, the printer 100 can communicate with a docked cell phone to issue commands to take pictures with the cell phone's digital camera or to call a number from the cell phone. The picture might show who is standing at the printer 100. That data could be transmitted to some other destination by the cell phone when it calls out. The called number could be provided in a profile stored on the cell phone, or it could be stored on the printer. Other examples are discussed below.

The communication module 604 sends 706 a request to the peripheral device for multimedia data to be downloaded to the printing system 100. Once the multimedia processing system 125 receives the multimedia data, the multimedia processing and formatting module 606 contains logic to format and process 708 the multimedia data. In an embodiment, the format may be pre-defined and configured for specific peripheral devices. In other embodiments, a user may design a layout format for the multimedia data via the user interfaces 110a, 110b. In yet another embodiment, a user may upload a pre-defined format. The multimedia processing and formatting module 606 provides an organized representation of the multimedia data depending on a particular peripheral device 150. For example, the formatter 606 may generate a format suitable for representation on printed output 165. Thus, if a video camcorder is docked directly to the printer, the format might comprise key frames with bar codes linking the key frames to different segments of a video file that may be used to replay a recorded video describing the event. Although the media processing system 125 is configured to perform at least some of the processing of the media data on the printer 100, it is preferably coupled to an external computing device that shares some of the computing burden. Network interface 157 allows communication with external network device 170 and/or external service 160, which are capable of performing at least a portion of the multimedia processing functionality. The network device 170 may be a computer system or a dedicated media processing hardware device. In this way, the printer 100 relieves the source of the multimedia from at least some of the processing burden required to implement the printer's functionality, but the printer 100 need not shoulder the entire burden. The printer 100 can thus avoid slow-downs that can result from a heavy processing load, which may be especially important for shared printers.

In step 710, the multimedia output generator module 608 creates an output of the formatted multimedia data. The output may be sent to the printed output system 115 where it will be printed on a document, or it may be sent to the electronic output system 120 where an electronic output will be produced. In one embodiment, the output may also be uploaded to a web server via network 155.

Interactive Communication with a Printer

Figure 8:
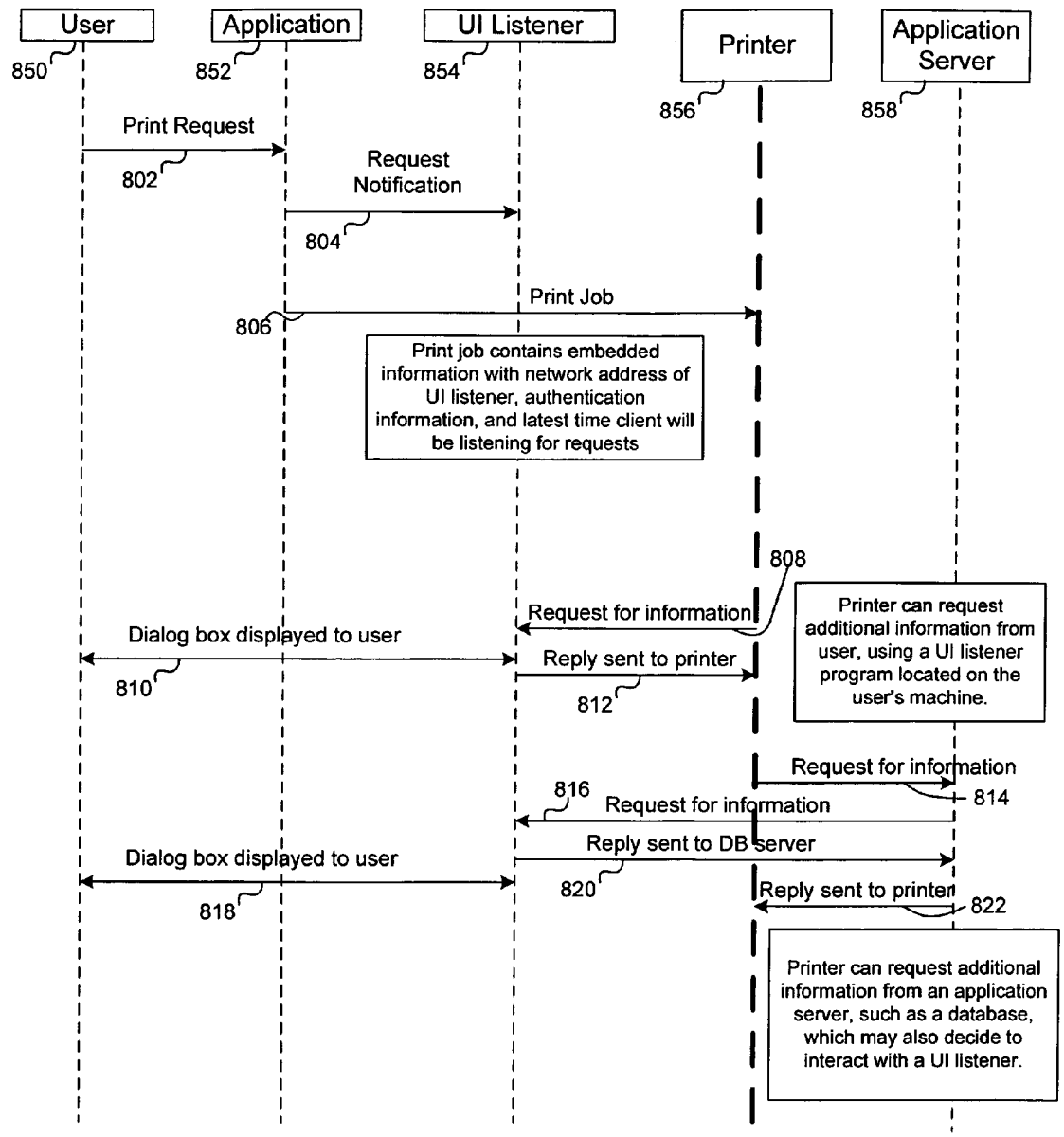
FIG. 8 is an illustration of interactive communication with the printer in accordance with an embodiment of the invention.

FIG. 8 shows an example of interactive communication with a printer in accordance with an embodiment of the present invention. In general, conventional printer drivers in modern operating systems are not designed to facilitate interactive information gathering. Because a print job can be redirected to another printer, or the printing protocol does not allow such interactive sessions, the operating system does not encourage interaction with the user. Once initial printer settings are captured, further interactions are generally not allowed in conventional printers. One approach to this problem is to embed metadata into the print stream itself, as noted above. However, it is possible that the printer could need to ask the user for more information, in response to computations made from the data supplied by the user. In addition, the printer might itself delegate some tasks to other applications on other devices, which might in turn need more information from the user. So-called "Web services" or "grid computing" systems are examples of the sort of application server that the printer might trigger.

In order to allow this interaction, without modifying printer driver architecture of the underlying operating system, an extra mechanism, such as the one shown in FIG. 8, is constructed. A "UI Listener," program 854 listens to a network socket, accepts requests for information 808, interacts with a user to obtain such data, and then sends the data back to the requester.

Once a print request 802 is sent by user 850 and notification is requested 804 from the UI listener 854, the print job is sent 806 by application 852. Here, the print job contains embedded information including the network address of the UI listener 854 authentication information, and the latest time that the client will be listening for requests.

If the printer 856 requires additional information or confirmation, it sends a request 808, which is detected by the UI listener 854 which displays a dialog box 810 to obtain input from the user 850. An example of such a request might be a request for a password or user confirmation code that the user must enter to access an application server 858. The users's input is included in a reply 812 sent to the printer. If the reply does not satisfy the printer it may ask for additional information (not shown). If the reply does satisfy the printer, it takes a next step. This step might be to perform an external action such as sending an email (not shown). The next step might also be sending a request for information 814 to an application server (such as a database) 858. In this example, application server 858 also sends a request for information 816, which is detected by the UI listener 854. The user 850 is prompted 818 and his response forwarded 820 to the application server 858. In this example, a reply 822 is then sent from the application server 858 to the printer 856. It will be understood that a particular embodiment may include either or none of requests 808 and 816 without departing from the spirit of the present invention.

A program such as that shown in FIG. 8 may have a fixed set of possible interactions, or may accept a flexible command syntax that allows the requester to display many different requests. An example of such a command syntax is the web browser's ability to display HTML forms. These forms are generated by a remote server, and displayed by the browser, which then returns results to the server. In this embodiment, however, the UI listener is different from a browser in that a user does not generate the initial request to see a form. Instead, the remote machine generates this request. In the described embodiment, the UI listener is a server, not a client.

Because network transactions of this type are prone to many complex error conditions, a system of timeouts preferably assures robust operation. Normally, each message sent across a network either expects a reply or is a one-way message. Messages which expect replies preferably have a timeout, a limited period of time during which it is acceptable for the reply to arrive. In this embodiment, embedded metadata includes metadata about a UI listener that will accept requests for further information. Such metadata preferably includes at least a network address, port number, and a timeout period. It can also include authentication information, designed to prevent malicious attempts to elicit information from the user. Because the user cannot tell whether the request is coming from a printer, a delegated server, or a malicious agent, prudence suggests strong authentication by the UI listener. If the printer or a delegated application server wishes more information, it can use the above-noted information to request that the UI listener ask a user for the needed information.

In one embodiment, printer 100 includes an interface 105 configured to support an image capture device. Examples of an image capture device include a digital still camera and a digital video camera. The user prints a document that contains instructions that drive the image capture device attached to the printer. The camera may be attached directly to the printer, e.g., via a cable, or may be wirelessly connected, for example using an 802.11 wireless networking connection. This allows the device to be located more remotely from the printer. The device can be instructed to take pictures or capture video immediately, or at some time in the future. The device is further instructed to print the captured pictures, either through the printed output system 115, the electronic output system 120, or both.

In various embodiments, printing system 100 includes a variety of peripheral interfaces 105 and network interfaces 157. For example, in one embodiment, printing system 100 includes an interface for a wireless keyboard. In another embodiment, a interface is included for capturing audio. In a further embodiment, an RJ-11 pass-through is included in printing system 100, in order to monitor telephone activity and print summary information about the calls. Attention is again drawn to U.S. patent application entitled, "Printer with Multimedia Server," filed Mar. 30, 2004, Ser. No. 10/814,500.

Other embodiments provide interfaces with additional functionality. Some examples of additional functionality include a Bluetooth interface for recording and relaying data; a cellular telephone interface for downloading and printing images, audio and video clips from a cellular telephone; a hardware and software interface for a digital audio recorder or digital video recorder; a hardware and software interface for a portable or fixed-position meeting recorder, including those with pan, tilt and zooming capabilities; an interface for a head-mounted video camera with a gyroscope and GPS capture; an interface for capturing activity in an office environment; and an interface for capturing video from a frame buffer of a computer.

In further embodiments, printing system 100 includes embedded technology such as a video reformatter; multimedia document formatter; video event detection logic; video foreground/background segmentation logic, face image detection, face image matching, facial recognition, and face extraction, matching and cataloging logic; video text localization and video OCR logic; video foreign language translation; video clip and video frame classification, including trainable video clip classification; digital image stitching; audio re-formatting; speech recognition; audio event detection; waveform matching; foreign language translation; caption alignment including caption alignment using video OCR; closed caption extraction and reformatting; speech recognition and closed caption plus transcript output; TV news segmentation and formatting; music cataloging; video database logic; movie database logic; digital photo catalog logic; multimedia retrieval; audio and video clip segmentation and web publishing logic; world-wide web search logic; video clip retrieval and key frame selection; image searching logic; weather map retrieval logic; aerial image retrieval logic, including image recognition and highlighting; streamlining media server logic; single and multi-channel streaming video monitoring and downloading; streaming audio monitoring, downloading and printing; meeting minutes extraction logic; video shot selection logic based on multiple audio sources; video clip segmentation logic including participant identification and cataloging; video clip segmentation based on audio event detection; embedded TV schedule extraction and formatting logic; radio news segmentation and formatting logic; radio program segmentation logic including face image retrieval; radio program segmentation and automatic home page retrieval; "books on tape" speech recognition and formatting software, including foreign language translation and formatting; map generation software for routing; route planning logic; forms recognition logic; text-to-speech logic; document summarization and text-to-speech logic; graph printing logic; and RFID signaling apparatus and variable content selection logic.

Further descriptions of the various embodiments described above are included in the following co-pending U.S. patent applications: "Printer With Hardware and Software Interfaces for Peripheral Devices," filed Mar. 30, 2004, Ser. No. 10/814,846; "Printing System With Embedded Audio/Video Content Recognition and Processing," filed Mar. 30, 2004, Ser. No. 10/13950; "Printer With Embedded Retrieval and Publishing Interface," filed Mar. 30, 2004, Ser. No. 10/814,536; "Printer with Radio or Television Program Extraction and Formatting," filed Mar. 30, 2004, Ser. No. 10/814,702; and "Printer With Document-Triggered Processing," filed Mar. 30, 2004, Ser. No. 10/814,580. Each of these references is incorporated herein in its entirety.

While examples of suitable printing systems are described above, the description of the printer and its document production means is not meant to be limiting. Depending on the intended application, a printer can take many different forms other than the typical office or home-use printer with which most people are familiar. Therefore, it should be understood that the definition of a printer includes any device that is capable of producing an image, words, or any other markings on a surface. Although printing on paper is discussed above, it should be understood that a printer in accordance with various embodiments of the present invention could produce an image, words, or other markings onto a variety of tangible media, such as transparency sheets for overhead projectors, film, slides, canvass, glass, stickers, or any other medium that accepts such markings.

In addition, the description and use of multimedia and multimedia data are not meant to be limiting, as multimedia may include any information used to represent any kind of media or multimedia content, such as all or part of an audio and/or video file, a data stream having multimedia content, or a transmission of multimedia content. Multimedia content may include one or a combination of audio (including music, radio broadcasts, recordings, advertisements, etc.), video (including movies, video clips, television broadcasts, advertisements, etc.), software (including video games, multimedia programs, graphics software, etc.), and pictures; however, this listing is not exhaustive. Furthermore, multimedia data may further include anything that itself comprises multimedia content or multimedia data, in whole or in part, and multimedia data includes data that describes a real-world event. Multimedia data can be encoded using any encoding technology, such as MPEG in the case of video and MP3 in the case of audio. They may also be encrypted to protect their content using an encryption algorithm, such as DES, triple DES; or any other suitable encryption technique.

Moreover, any of the steps, operations, or processes described herein can be performed or implemented with one or more software modules or hardware modules, alone or in combination with other devices. It should further be understood that portions of the printer described in terms of hardware elements may be implemented with software, and that software elements may be implemented with hardware, such as being hard-coded into a dedicated circuit. In one embodiment, a software module is implemented with a computer program product comprising a computer-readable medium containing computer program code, which can be executed by a computer processor for performing the steps, operations, or processes described herein.

In alternative embodiments, the printer can use multiple application servers, acting in cooperation. Any of the requests or messages sent or received by the printer can be sent across a network, using local cables such as IEEE1394, Universal Serial Bus, using wireless networks such as IEEE 802.11 or IEEE 802.15 networks, or in any combination of the above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A printer for printing time-based media, the printer comprising:
a printing sub-system within the printer for receiving and printing standard document formats;
an interface within the printer that receives the time-based media from a media source, the interface coupled to the printing sub-system;
a multimedia processing system within the printer and coupled to the interface that issues a command that controls the media source to transmit the time-based media to the multimedia processing system and that distributes, between the multimedia processing system within the printer and a system external to the printer, a determination of an electronic representation and a printed representation of the time-based media;
a first output device, within the printer and in communication with the multimedia processing system to receive the electronic representation, for producing a corresponding electronic output from the electronic representation of the time-based media; and
a second output device, within the printer and in communication with the multimedia processing system to receive the printed representation, for producing a corresponding printed output from the printed representation of the time-based media.

2. The printer of claim 1, wherein the printed output is generated on a video paper.

3. The printer of claim 1, wherein the electronic output is stored on a media recorder.

4. The printer of claim 1, wherein the electronic output is stored on a removable storage device.

5. The printer of claim 4, wherein the removable storage device is selected from a group consisting of a DVD, a CD-ROM, an audio cassette tape, a video tape, a flash card, a memory stick, and a computer disk.

6. The printer of claim 1, wherein the interface comprises an ultrasonic pen capture device.

7. The printer of claim 1, wherein the interface comprises a parallel port.

8. The printer of claim 1, wherein the interface comprises a wireless communication interface.

9. The printer of claim 1, wherein the interface comprises a serial interface.

10. The printer of claim 9, wherein the serial interface is a USB interface.

11. The printer of claim 1, wherein the interface comprises a docking station.

12. The printer of claim 11, wherein the docking station is built into the printer.

13. The printer of claim 1, wherein the interface comprises an optical port.

14. The printer of claim 1, wherein the interface comprises a video port.

15. The printer of claim 1, wherein the interface comprises a port for connecting the media source, the port selected from a group consisting of SCSI, IDE, RJ11, composite video, component video and S-video.

16. The printer of claim 1, wherein the interface comprises a removable storage reader.

17. The printer of claim 16, wherein the removable storage reader comprises media reader selected from a group consisting of a DVD reader, a flash card reader, a memory stick reader, a CD reader, a computer disk reader, and an SD reader.

18. The printer of claim 1, wherein the media source comprises a cellular telephone.

19. The printer of claim 1, wherein the media source comprises a video camcorder.

20. The printer of claim 1, wherein the media source comprises a digital audio recorder.

21. The printer of claim 1, wherein the media source comprises a media input device selected from a group consisting of a DVD reader, a video cassette tape reader, a CD reader, an audio cassette tape reader, a flash card reader, a digital video recorder, a video capture device, and a meeting recorder.

22. The printer of claim 1, wherein the multimedia processing system comprises a video stream processor.

23. The printer of claim 22, wherein the multimedia processing system comprises a video key frames extractor.

24. The printer of claim 22, wherein the multimedia processing system generates a bar code, the bar code corresponding to a video segment in the video stream.

25. The printer of claim 1, wherein the multimedia processing system is configured to generate a web page representation of the multimedia.

26. The printer of claim 1, wherein the multimedia processing system is configured for controlling at least one external functionality of the media source.

27. The printer of claim 1, wherein the multimedia processing system is configured to automatically detect a communicative coupling of the media source.

28. The printer of claim 1, wherein the multimedia processing system is configured to automatically download multimedia data from the media source.

29. The printer of claim 1, wherein the interface comprises a database server.

30. The printer of claim 29, wherein the database server comprises a music catalog.

31. The printer of claim 29, wherein the database server comprises a video database.

32. The printer of claim 29, wherein the database server comprises a web search engine.

33. The printer of claim 1, wherein the multimedia processing system comprises a text-to-speech system.

34. The printer of claim 1, wherein the multimedia processing system comprises an image detection system.

35. The printer of claim 1, wherein the multimedia processing system comprises a face recognition system.

36. The printer of claim 1, wherein the multimedia processing system comprises a speech recognition system.

37. The printer of claim 1, wherein the system external to the printer is an external computing device.

38. The printer of claim 1, wherein the system external to the printer is an external network service.

39. The printer of claim 1, wherein the multimedia processing system is configured to communicate with the system external to the printer.

40. The printer of claim 1, wherein the multimedia processing system is configured to control functionality in the system external to the printer.

41. The printer of claim 1, wherein sending commands to the media source further comprises controlling the media source to transmit the time-based media to a system separate from the printer.

42. The printer of claim 1, wherein sending commands to the media source further comprises controlling the media source to capture external data.

43. The printer of claim 1, wherein the multimedia processing system is configured to output a status message for display on a display of the media source.

44. The printer of claim 1, wherein the multimedia processing system is configured to output video for display on a display of the media source.

45. The printer of claim 1, wherein the multimedia processing system is configured to output audio using a speaker of the media source.

46. A method for printing time-based media, the method comprising:
    receiving and printing at a printing sub-system within a printer standard document formats in response to user input;
    issuing a command from a multimedia processing system within the printer that controls the media source to transmit the time-based media to the multimedia processing system;
    receiving the time-based media from the media source;
    automatically determining an electronic representation and a printed representation of the time-based media, wherein the determining is distributed between the multimedia processing system and a system external to the printer;
    producing a corresponding electronic output from the electronic representation of the time-based media; and
    producing a corresponding printed output from the printed representation of the time-based media.

47. The method of claim 46, wherein the electronic output is stored on a media recorder.

48. The method of claim 46, wherein the electronic output is stored on a removable storage device.

49. The method of claim 48, wherein the removable storage device is selected from a group consisting of a DVD, a CD-ROM, an audio cassette tape, a video tape, a flash card, a memory stick, and a computer disk.

50. The method of claim 46, wherein the media source comprises a cellular telephone.

51. The method of claim 46, wherein the media source comprises a video camcorder.

52. The method of claim 46, wherein the media source comprises a digital audio recorder.

53. The method of claim 46, wherein the media source comprises a media input device selected from a group consisting of a DVD reader, a video cassette tape reader, a CD reader, an audio cassette tape reader, a flash card reader, a digital video recorder, a video capture device, and a meeting recorder.

54. The method of claim 46, wherein the system external to the printer is an external computing device.

55. The method of claim 46, wherein the system external to the printer is an external network service.

56. The method of claim 46, wherein sending commands to the media source further comprises controlling the media source to transmit the time-based media to a system separate from the printer.

57. The method of claim 46, wherein sending commands to the media source further comprises controlling the media source to capture external data.

* * * * *